United States Patent
Morimoto et al.

(10) Patent No.: US 7,016,807 B2
(45) Date of Patent: Mar. 21, 2006

(54) DEVICE AND METHOD FOR MONITORING A PROGRAM EXECUTION

(75) Inventors: Yoshiaki Morimoto, Kawasaki (JP); Kouji Doi, Yokohama (JP); Shinichiro Kawasaki, Yokohama (JP); Motoaki Satoyama, Sagamihara (JP); Shigeru Santo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/637,268

(22) Filed: Aug. 8, 2003

(65) Prior Publication Data

US 2004/0153825 A1    Aug. 5, 2004

(30) Foreign Application Priority Data

Sep. 24, 2002 (JP) .............................. 2002-276556
Mar. 19, 2003 (JP) .............................. 2003-074805

(51) Int. Cl.
*G06F 3/023* (2006.01)

(52) U.S. Cl. ...................... 702/183; 702/182; 702/186; 702/188

(58) Field of Classification Search ................ 702/62, 702/127, 182, 186–188, 183; 705/57; 709/201; 717/174, 157
See application file for complete search history.

(56) References Cited

U.S. PATENT DOCUMENTS

| 6,292,940 B1 * | 9/2001 | Sato ............................ 717/157 |
| 6,718,378 B1 * | 4/2004 | Machida ....................... 709/223 |
| 2003/0236758 A1 * | 12/2003 | Iwatani et al. .............. 705/400 |

FOREIGN PATENT DOCUMENTS

| JP | 06-314221 | 11/1994 |
| JP | 11-184727 | 7/1999 |

* cited by examiner

*Primary Examiner*—Marc S. Hoff
*Assistant Examiner*—Felix Suarez
(74) *Attorney, Agent, or Firm*—Townsend and Townsend and Crew LLP

(57) ABSTRACT

A method for inserting monitor code into a program, improved to monitor the execution of any part of a program, is proposed. By embedding monitor code in place within a sequence of executable codes constituting a function to be monitored when reading the program and executing monitor actions through the intervention of stub functions during the program execution, monitoring the program execution is performed without placing loads on the run of the program other than the functions to be monitored.

8 Claims, 7 Drawing Sheets

FUNCTION TABLE

| INDEX | FUNCTION NAME | START ADDRESS | END ADDRESS | ATTRIBUTE |
|---|---|---|---|---|
| 1 | Test | 00000000H | 0000FFFFH | static |
| 2 | foo | 00010000H | 0001FFFFH | public |
| 3 | dummy | 00020000H | 0002FFFFH | static |
| ⋮ | ⋮ | ⋮ | ⋮ | ⋮ |

531   532   533   534   535

BEFORE MONITOR CODE INSERTION     AFTER MONITOR CODE INSERTION

| FUNCTION TO BE MONITORED | FUNCTION TO BE INSERTED |
|---|---|
| FUNCTION A | STUB FUNCTION B |
| FUNCTION A | STUB FUNCTION C |
| ⋮ | ⋮ |

DEVICE AND METHOD FOR MONITORING A PROGRAM EXECUTION

BACKGROUND OF THE INVENTION

The present invention relates to a method for efficiently monitoring program execution during a program run on a computer.

A most commonly used method for monitoring the execution of a program run on a computer is, for example, embedding code for log output into program source code and compiling the source code, so that execution logs are obtained during program execution, which is a basic technique for developing programs. This kind of technique has been disclosed in, for example, Japanese Patent Laid-Open No. H6(1994)-314221.

Most debuggers that are now available realize their function by inserting debug code into a program. For example, a software interrupt instruction is embedded into a program so that the interrupt occurs when the instruction code is executed and thereby the program execution can be checked easily. This kind of technique has been disclosed in, for example, Japanese Patent Laid-Open No. H11(1999)-184727.

Profiling tools which measure runtime per segment of a program to detect a bottleneck in the program execution are available and often used in a program optimization process. These tools insert monitor code into a program during a read of the program and monitor the program execution state by executing the monitor code.

In order to implement the above-mentioned method of embedding code for log output into program source, the program source and an environment for compiling the source are necessary. In the absence of either of these necessities, the above method cannot be practiced. The debuggers are developed to be used when programs are developed and it is difficult to apply them to low-load use during program execution. Besides, the debuggers cannot be used in an execution environment for interpreter programs.

As for the profiling tools, a complex process is required for inserting monitor code into a program without affecting the program operation (for example, stack manipulation is required for monitoring arguments).

SUMMARY OF THE INVENTION

The present invention provides a low-load and easily-applicable method for inserting monitor code into a program, which can be used even during system operation.

In order to solve the above-described problems, when executing a program on a computer which includes a program storage unit to store programs comprising a plurality of functions and a program execution unit which reads a program from the storage unit and executes the program, the following are performed: judging whether a function within the program read from the storage unit is to be monitored; and inserting monitor code into the program so that monitor actions are performed for the function to be monitored.

One monitor code is inserted in the beginning of the function to be monitored and another monitor code is inserted immediately before a return statement to return from the function. As the program execution unit executes the function and the monitor codes inserted within the function, the function execution state can be judged by the monitor codes executed.

After change is made to an address or name by which the function to be monitored is called, a function for monitoring which comprises a function for monitoring including a statement to call the renamed function and the above monitor codes may be generated and inserted into the program.

In this case, monitor code can be created by user according to user preference, and, after the monitor code is compiled by a compiler, it is modified and incorporated into a function for monitoring. Because such user-created code of user preference can be used as monitor code, highly adaptable monitoring of program execution can be accomplished.

According to the present invention, monitoring the execution of particular or all functions within a program can be performed, dispensing with the source code and compiling work for the program to be monitored. When monitor code is inserted into particular functions (which require monitoring), using the present invention, monitoring can be performed without placing loads on the execution of other functions. When a mode is applied in which stub functions are inserted into a program, monitor code described by user according to user preference can be inserted and highly adaptable monitoring of program execution can be performed.

DETAILED DESCRIPTION OF PREFERRED EMBODIMENT

A preferred embodiment of the present invention will be described hereinafter with reference to the accompanying drawings. It should be appreciated that the present invention is not limited to the preferred embodiment.

Figure 1:
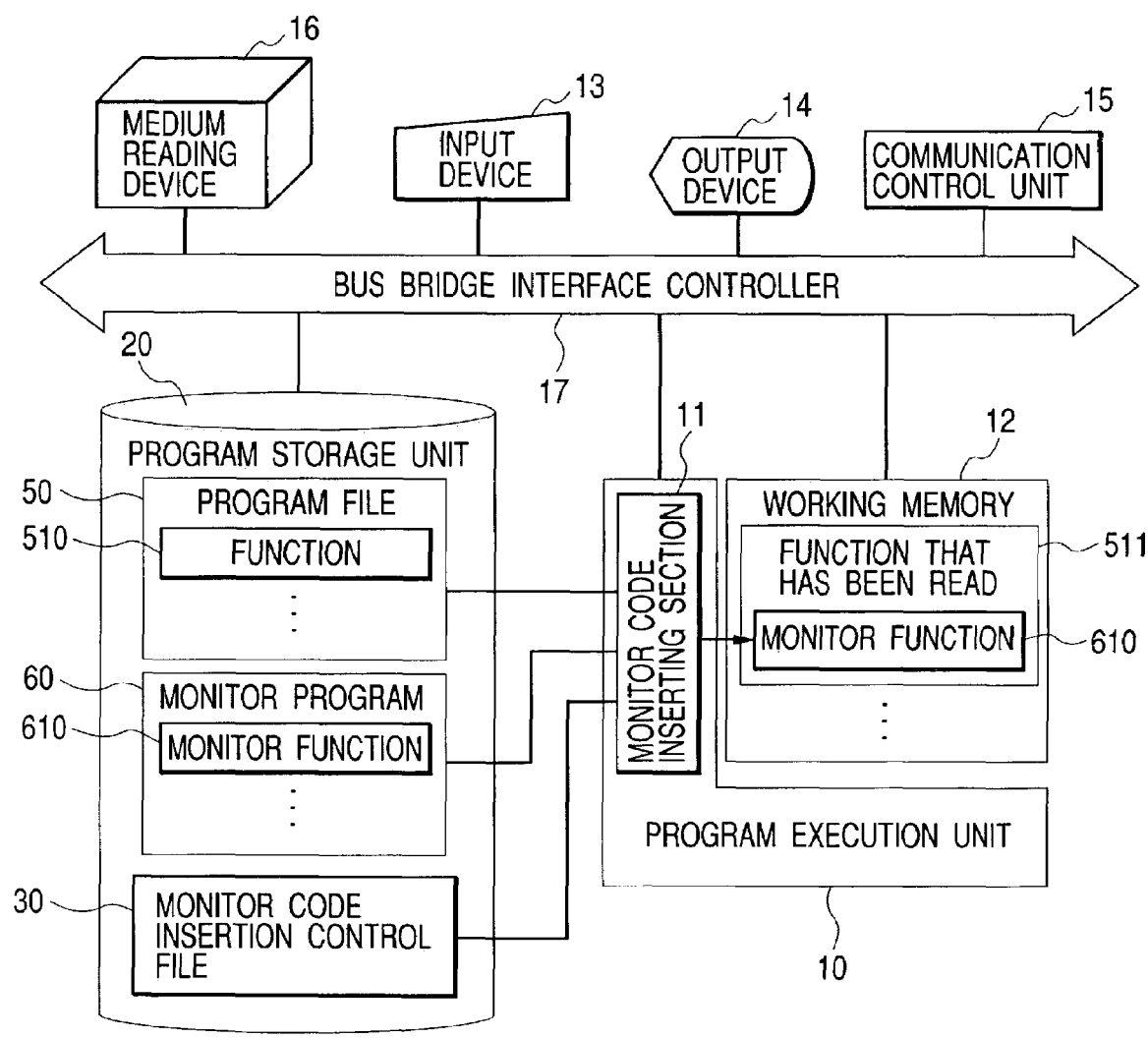
FIG. 1 is a block diagram showing an overall device structure according to a preferred embodiment of the present invention.

FIG. 1 shows an overall device structure according to a preferred embodiment of the present invention. This preferred device embodiment of the invention is built by incorporating a monitor code inserting section 11, a monitor code insertion control file 30, and a monitor program 60 into a commonly used program execution device in which a program execution unit 10 operating on a computer reads and executes a program file 50 stored in a program storage unit 20.

The program execution unit 10 may be of either a type for interpreter execution or a type for normal execution, the latter type executing a machine language. Either type comprises a CPU, the primary element for execution. The program storage unit 20 may be any type of device on which programs can be recorded, such as disk storage, memory cards, and magnetic tape. The monitor code insertion control file 30 is to store information by which it is determined whether a function in a program is to be monitored. This file may consist of a simple file or another program which runs on another computer or the same computer.

The program execution device comprises, in addition to the program execution unit 10 and the program storage unit 20, a working memory 12 to temporarily store a program and data which are read from the program storage unit or the like and executed by the program execution unit 10, an input device 13 through which an operator can input a command for action such as program execution to the device, a display 14 for visual output of program execution progress, the result of execution, etc., a communication control unit 15 which controls communication with another device via a communication channel, and a medium reading device 16 which is used for installing the contents of a storage medium in a program storage unit 20 if the storage medium such as a CD-ROM having the monitor program, the monitor code insertion control file, and the like stored thereon is traded. The medium reading device, input device, output device, and communication control unit are connected to the program storage unit and the program execution unit via an internal bus bridge 17. The bus bridge 17 shown also functions as an interface controller between the working memory and the input device, display, etc.

Figures 2, 3:
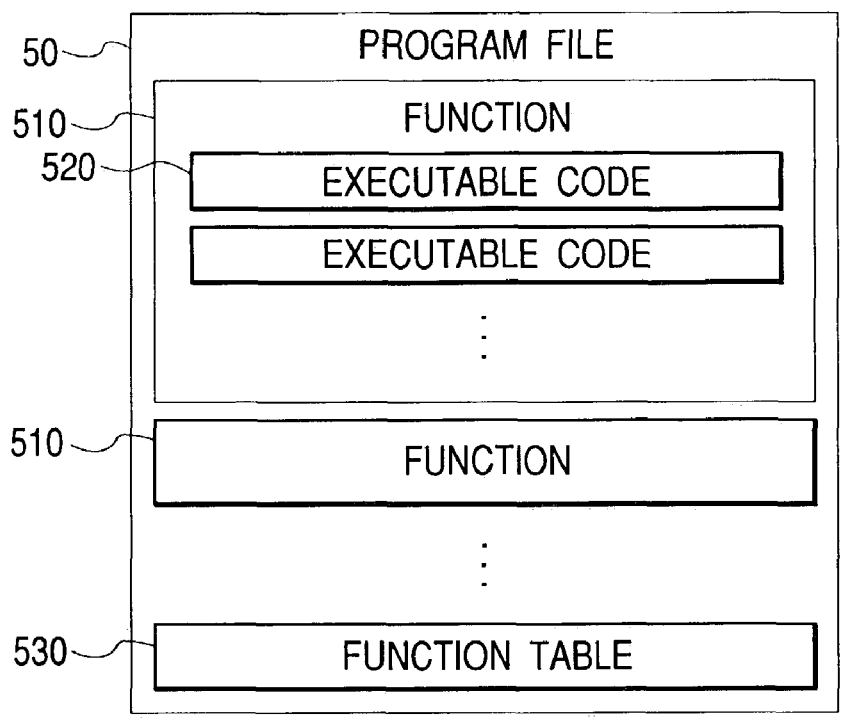
FIG. 2 is a diagram showing an illustrative program file structure.
FIG. 3 shows an example of structure of a function table.

FIG. 2 shows an illustrative structure of the program file 50. The program file 50 contains any number of functions 510. A function consists of one or a plurality of executable codes 520. The executable code 520 may be either machine language code if the program execution unit is the normal program execution type or intermediate code (also called byte code) if the program execution unit is the interpreter execution type. The program file 50 includes a function table 530. The function table 530 contains information about the functions in the file, indicating how the functions are arranged in the program file structure, what attributes of the functions, and others. While the function table 530 forms a part of the program file 50 as shown in FIG. 2, another file to contain the function table may be created, for example, like a MAP file which is output from a generally used complier.

FIG. 3 shows an example of structure of the function table. The function table 530 contains the following columns: index 531, function name 532, start address 533, end address 534, and attribute 535. The information on each function in the program file is stored row by row.

Figure 4:
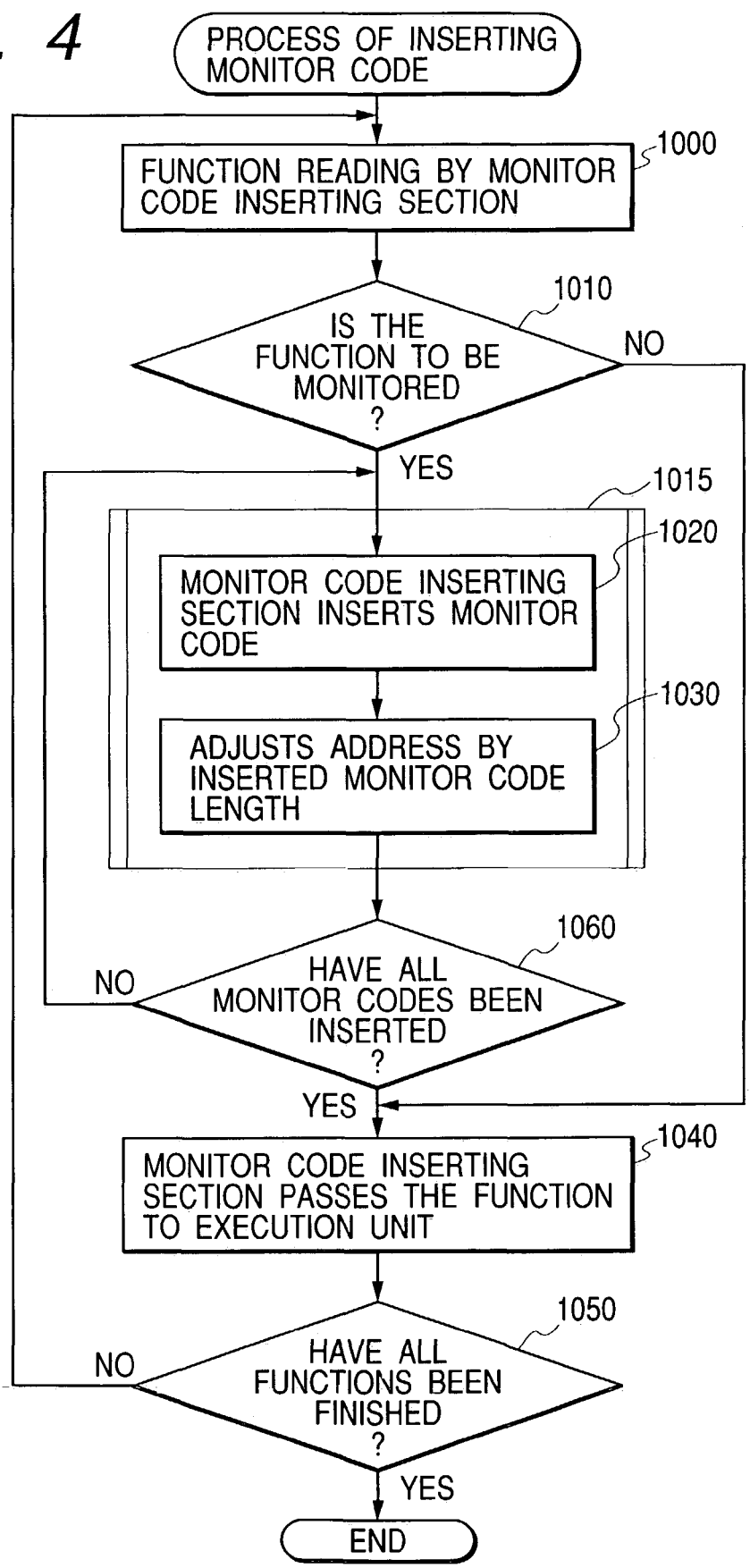
FIG. 4 is a flowchart illustrating a procedure of inserting monitor code.

FIG. 4 is a flowchart illustrating a process of inserting monitor code into a program while reading the program file 50, the process being performed by the program execution unit 10 in the preferred device embodiment of the invention. First, the program execution unit 10 reads one function from the program file 50 and hands over the function reading to the monitor code inserting section 11 (step 1000). The monitor code inserting section 11 judges whether or not the function is to be monitored, based on the information from the monitor code insertion control file 30 (step 1010), inserts monitor code into the function if the function is to be monitored (step 1020), and adjusts the end address of executable code(s) subsequent to the inserted monitor code by inserted monitor code length, thus updating the function table 530 (step 1030). After repeating the steps 1020 and 1030 until insertion of all monitor codes for the function of interest is finished, the monitor code inserting section 11 passes the function to the program execution unit 10 (1040).

The above steps are performed for all functions (step 1050). The program execution unit 10 executes the function passed from the monitor code inserting section 11 in the step 1040 in parallel with the above steps being repeated.

Figure 5:
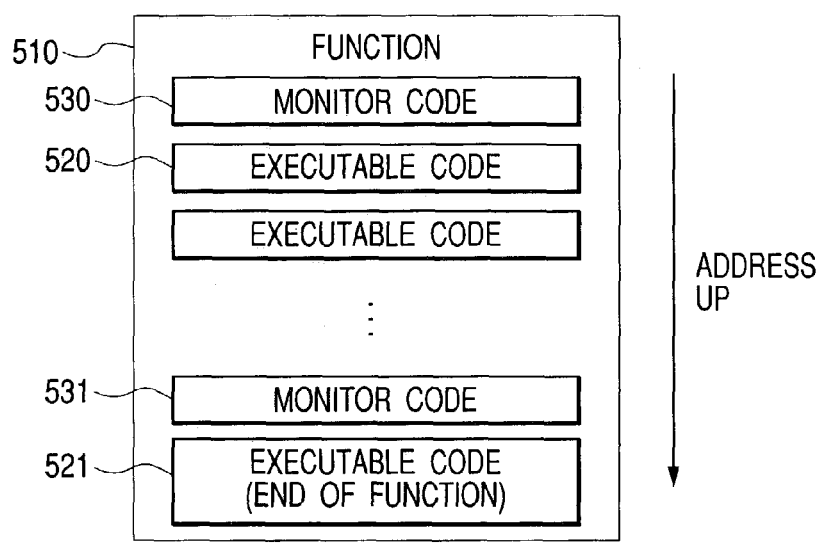
FIG. 5 is a diagram showing an illustrative structure of a function into which monitor codes have been inserted.

FIG. 5 is a diagram showing an illustrative structure of a function into which monitor codes have been inserted by the method of inserting monitor code illustrated in FIG. 4. The codes shown here are sequentially executed from the top to down. In this method illustrated, one monitor code 530 is first embedded in the beginning of the function and another monitor code 531 is then inserted immediately before an executable code 521 which indicates the end of the function, that is, execution of the code causes a return to the point at which the function was called.

Because the program execution unit 10 sequentially executes the program file into which the monitor codes are inserted as above by the monitor code inserting section 11, it executes the first monitor code immediately after the function is called into execution and the second monitor code immediately before the end of the function, and the execution of these monitor codes makes it possible to monitor the runtime of the function, the number of times of execution, and arguments or the like passed to the function when the function was called.

The monitor code may be a module which consists of a plurality of executable codes or a function call code to call another monitor code library. If machine language code is executed, the monitor code may be code of a software interrupt instruction. Conceivable examples of actions to be performed by monitor code are external hardware control, log output, variable value change, etc. It may be possible to insert only a monitor code either in the beginning of function execution or immediately before the end of the function execution.

Next, another example of a method of inserting monitor code will be described, using FIG. 6. In this method, first, a function to be monitored (for example, function A in this example) (610) is changed so that it is handled as another function in program execution (615). For example, in an execution mode in which functions are called by address, such function change can be made by referring to the function table (620) and relocating the function to another available address. In an execution mode in which functions are called by index which is specified for each function in the function table (620), this mode being often used in interpreter languages, such function change can be made by adding a new entry to the function table (620), assigning the function another name, and copying other information from the original. Then, a stub function (611) which is called when the former function A is called is inserted. In this stub function (611), code (613) to call the renamed function A is described. Thereby, a call for the function A (610) calls the stub function (611) from which the "renamed function A" (615) is called. Also, one monitor code (612) is inserted before the code (613) to call the renamed function A in the stub function (611), so that the monitor code (612) is executed prior to the renamed function A (615). Another monitor code (614) is also inserted to be called after the execution of the renamed function A (615). Within these monitor codes, argument values to be passed to the function A can be monitored or changed and a return value from the function A can be monitored and changed.

Figure 6:
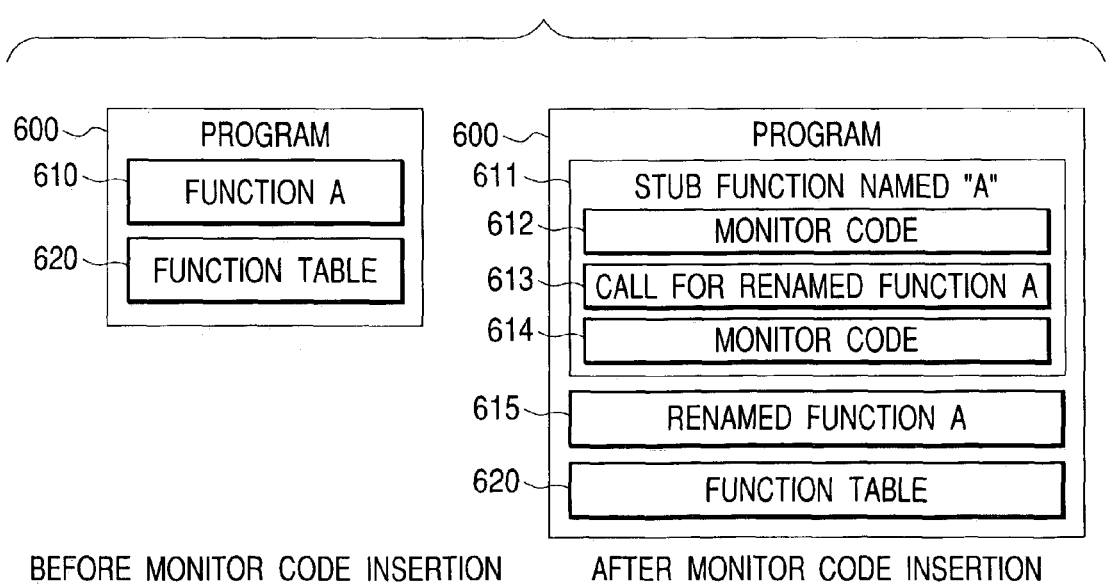
FIG. 6 is a diagram explaining another example of inserting monitor code.
Figure 7:
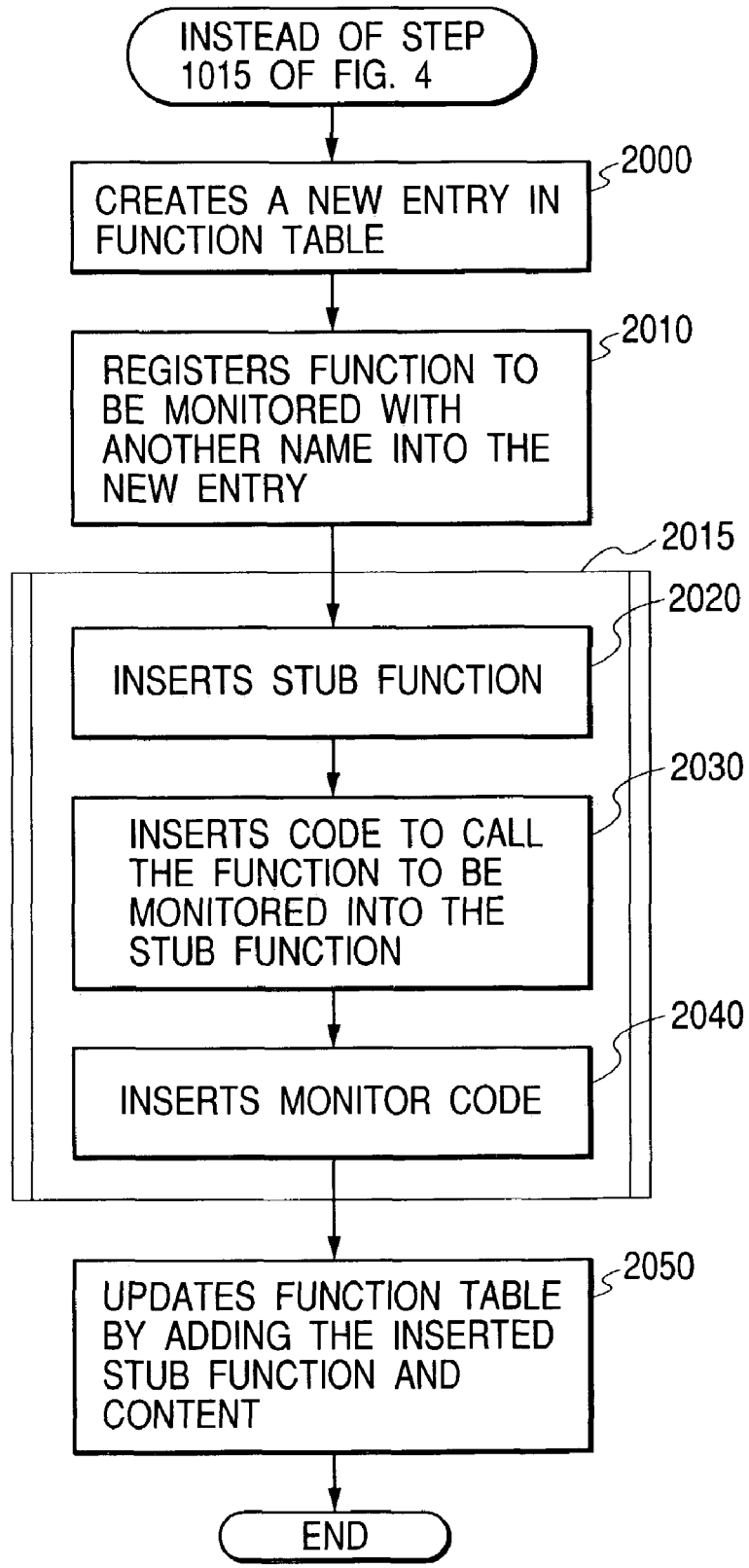
FIG. 7 is a flowchart illustrating another procedure of inserting monitor code through a method in which a sub function is inserted.

FIG. 7 is a flowchart illustrating a process of inserting monitor code through the method explained in FIG. 6. This process differs from the process explained in FIG. 4 only in performing different steps in the block of step 1015 of FIG. 4 and only the steps to be performed instead of the step 1015 will be described. This flowchart explains the above process, assuming that the mode in which the program execution unit 10 calls functions by the index 531 in the function table 530 is applied. First, a new entry is created in the function table in order to change the read function to a function with another name (step 2000). Then, the function which was read in the step 1000 of FIG. 4 is registered into the new entry as another function to be handled within the program (step 2010). Next, a stub function for monitoring is inserted (step 2020), followed by inserting code to call the function to be monitored, which was registered into the new entry in the step 2010, from the stub function (step 2030), and followed by inserting monitor code (step 2040). Finally, the function table is updated so that the stub function inserted in the step 2020 functions as the object to be monitored.

By performing the above-described process, the execution of the function to be monitored can be monitored through the intervention of the stub function inserted in the step 2020.

In the steps 2020 through 2040 of FIG. 7, the stub function was programmatically generated. In this case, in order to allow the user to control monitor code behavior in detail, the monitor code inserting section 11 must be provided with functionality for supporting such control. Meanwhile, user-created code may be incorporated into the stub function as the object to be monitored, wherein all to do is modifying the user-created code and inserting that code into the stub function. Inserting monitor code of user preference can be performed easily.

An illustrative procedure for inserting user-created monitor code will be explained, using a flowchart of FIG. 8. This procedure differs from the process explained in FIG. 7 only in performing different steps in the block of step 2015 of FIG. 7 and only the steps to be performed instead of the step 2015 will be described. First, call convention of the function to be monitored is obtained (step 3000). The call convention specifies requirements for calling a function such as arguments to be passed to and return values to be returned from the function. By the obtained call convention, source code of the stub function is generated (step 3010). The source code may be output to a file or a GUI window created. The user may modify the source if necessary (step 3020) and the source is complied (step 3030). The source compiling maybe performed by the monitor code inserting section 11 upon the detection of modification to the source made by the user or may be performed by the user. After the compiling is finished, a stub function portion which is created and compiled is extracted from the complied code and inserted as the stub function (step 3040) Finally, checking is performed to ensure that the content of the inserted stub function is not in conflict with the program execution and the stub function content may be modified if necessary (step 3050) In the foregoing procedure, after the stub source is output (step 3010), the source is compiled (step 3030), and the stub function extracted from the source is inserted. However, the foregoing procedure may be shortened in a quicker mode in which the user must perform source compiling in advance before the program execution and only the steps 3040 and 3050 are executed to insert the stub function, based on information as to which source code should be inserted, obtained from the monitor code insertion control file 30. Alternatively, another program comprising only the steps 3000 through 3030 may be created and installed separately.

In the foregoing embodiment, if diverse types of monitoring actions are performed with a single function to be monitored, a plurality of such actions should be specified in a single stub function. Next, a method of inserting a plurality of monitor codes with a single function to be monitored will be described.

Figures 9, 10:
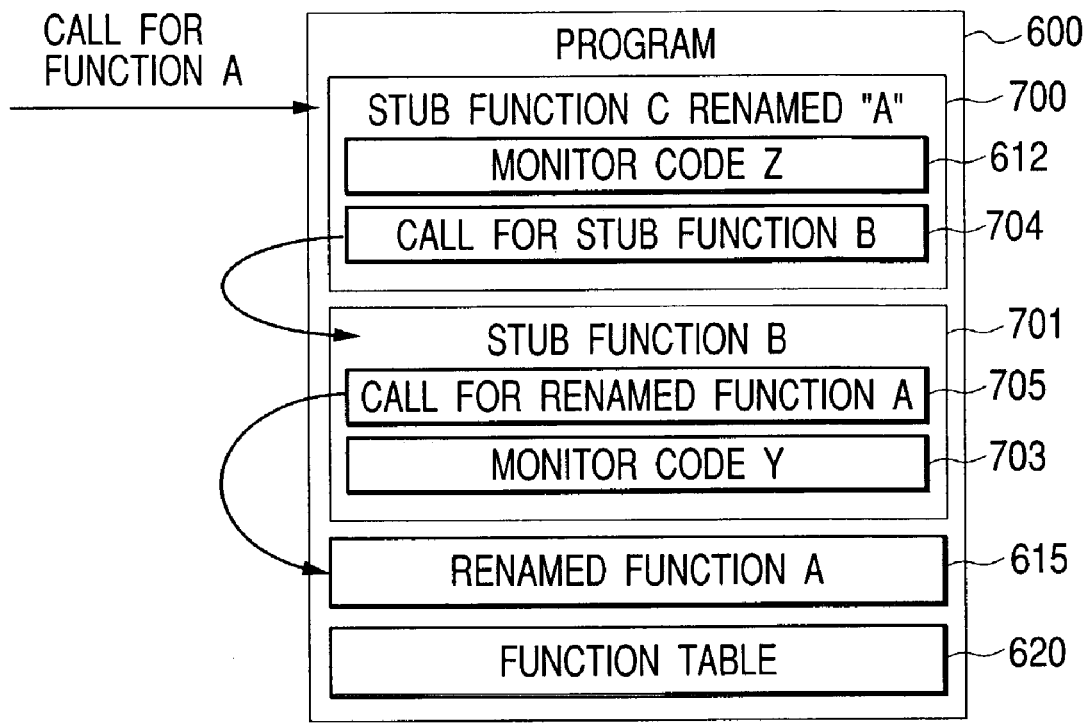
FIG. 9 is a diagram showing a part of illustrative program structure using a plurality of stub functions.
FIG. 10 shows a table in which order in which the plural stab functions used are inserted is specified.

FIG. 9 depicts building a program by the above method. By the method of inserting monitor code, as illustrated in FIG. 6, a single stub function is used and monitor codes are incorporated into it. On the other hand, in the method applied for building the program illustrated in FIG. 9, a plurality of functions are inserted into the program, including a plurality of stub functions: stub function B and stub function C (two stub functions are inserted in the example of FIG. 9). With the program built in this way, when stub function C (700) which was renamed A is called, monitor code Z (612) is first executed and a call for stub function B (704) occurs. Then, the stub function B (701) calls renamed function A (705) and monitor code Y (703) is executed after the call is finished. By calling the stub functions nested in this structure, the plural monitor codes can be executed by a single function call.

FIG. 10 shows a table example which is input to the monitor code insertion control file 30, where which stub function should be inserted, associated with function A, is specified. The table of FIG. 10 contains two columns of function to be monitored (801) and function to be inserted (802) and function-to-function mapping in each row, where in a plurality of functions associated with a same function to be monitored can be inserted. The table of FIG. 10 gives an example in which stub function B and stub function C are inserted, associated with function A. By building the program of monitoring so that the functions will be inserted and called according to the top-down order of the functions described in the columns, the accuracy of the monitoring can be enhanced. For example, a stub function having monitor code to measure the runtime of a function should be inserted immediately before the function to be monitored if possible. By building the monitoring program that can reflect such user intention, the accuracy of the monitoring can be enhanced.

Figure 8:
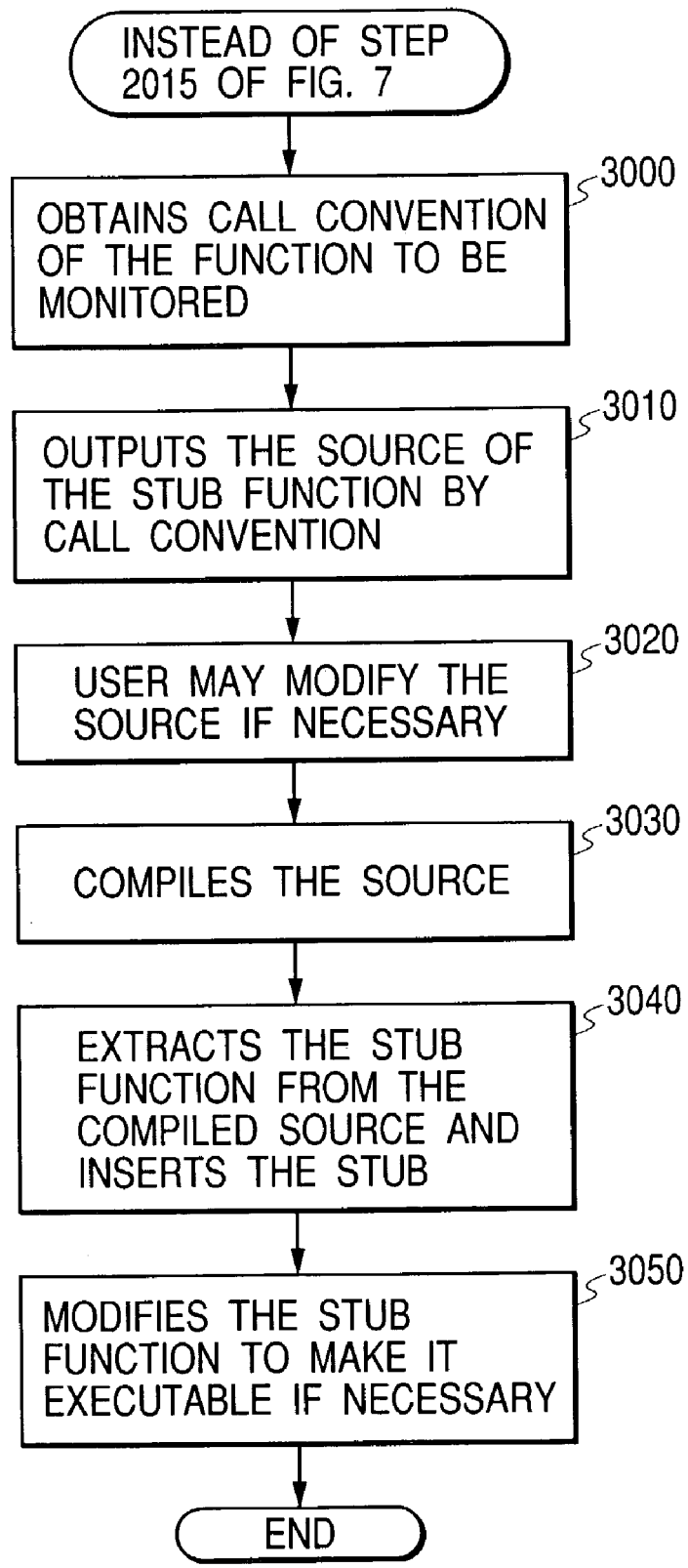
FIG. 8 is a flowchart illustrating another example of the above procedure through the method in which a stub function is inserted.

Once having inserted a stub with the changed name of the function to be monitored, the stub is regarded as the function to be monitored through the next read and the flowcharts of FIG. 4 and FIG. 8 are applicable to it without being altered.

While source is generated and complied in the above-described procedure in the foregoing embodiment, for example, it may be converted into an assembler executable form, using an assembler language. Also, another mode may be applied in which the user enters byte code of a machine language or interpreter and monitoring specified in the byte code is executed.

What is claimed is:

1. A device for monitoring program execution comprising:

means for storing programs comprising a plurality of functions;

means for judging whether a function within a program read from said storing means is to be monitored;

means for inserting monitor code into the program so that monitor actions are performed for the function to be monitored, including changing an address or name by which the function to be monitored is called, generating a function for monitoring which comprises said monitor codes and a statement to call the changed function, and inserting said function for monitoring into the program; and means for executing the function in the program and the monitor code inserted within the function, thereby performing the function and the monitor actions for the function.

2. The device according to claim 1, wherein said monitor code inserting means generates a source code as a template of the function to be generated for monitoring, extracts the function for monitoring from program code which is obtained by compiling the source code which may be modified by user, and inserts the function for monitoring into the program.

3. The device according to claim 1, wherein said monitor code inserting means inserts a plurality of functions for monitoring in such a manner that the plural functions are nested in a single function call so as to be called in order and that the plurality of monitor codes are executed in order by the single function call.

4. The device according to claim 3, wherein the order in which the functions for monitoring are nested and inserted can be specified.

5. A method for monitoring program execution for use in a computer which includes a program storage unit to store programs having a plurality of functions and a program execution unit to read a program from the storage unit and to execute the program, the method comprising:

judging whether a function within the program read from said storage unit is to be monitored or not;

changing an address or name by which the function to be monitored is called;

generating a function for monitoring which comprises said monitor codes and a statement to call the changed function; and inserting said function for monitoring into the program.

6. The method according to claim 5, wherein said step of inserting includes generating a source code as a template of the function to be generated for monitoring, extracting the function for monitoring from program code which is obtained by compiling the source code which may be modified by a user, and inserting the function for monitoring into the program.

7. The method according to claim 5, wherein said step of inserting includes inserting a plurality of functions for monitoring in such a manner that the plural functions for monitoring are nested in a single function call so as to be called in order and that the plurality of monitor codes are executed in order by the single function call.

8. The method according to claim 7, wherein the order in which the functions for monitoring are nested and inserted can be specified.

* * * * *